United States Patent
Choi et al.

(10) Patent No.: US 8,559,950 B2
(45) Date of Patent: Oct. 15, 2013

(54) RADIO BASE STATIONS, RADIO COMMUNICATION DEVICES, METHODS FOR CONTROLLING A RADIO BASE STATION, AND METHODS FOR CONTROLLING A RADIO COMMUNICATION DEVICE

(75) Inventors: Hyung-Nam Choi, Hamburg (DE); Maik Bienas, Braunschweig (DE)

(73) Assignee: Intel Mobile Communications GmbH, Neubiberg (DE)

( * ) Notice: Subject to any disclaimer, the term of this patent is extended or adjusted under 35 U.S.C. 154(b) by 521 days.

(21) Appl. No.: 12/697,316

(22) Filed: Feb. 1, 2010

(65) Prior Publication Data

US 2011/0190011 A1     Aug. 4, 2011

(51) Int. Cl.
*H04W 4/00*     (2009.01)

(52) U.S. Cl.
USPC ................. 455/435.1; 455/450; 455/458

(58) Field of Classification Search
USPC ...................... 455/435.1, 450, 458
See application file for complete search history.

(56) References Cited

U.S. PATENT DOCUMENTS

| | | | |
|---|---|---|---|
| 7,616,696 | B1 | 11/2009 | Mansour et al. |
| 7,961,700 | B2 | 6/2011 | Malladi et al. |
| 8,169,953 | B2 | 5/2012 | Damnjanovic et al. |
| 8,331,256 | B2 | 12/2012 | Lee et al. |
| 2005/0147127 | A1 | 7/2005 | Putcha et al. |
| 2006/0116123 | A1 | 6/2006 | Purnadi et al. |
| 2008/0227453 | A1 | 9/2008 | Somasundaram et al. |
| 2009/0088160 | A1 | 4/2009 | Pani et al. |
| 2009/0186627 | A1 | 7/2009 | Zhang |
| 2009/0280823 | A1 | 11/2009 | Petrovic et al. |
| 2010/0130218 | A1* | 5/2010 | Zhang et al. ................ 455/450 |
| 2010/0279691 | A1* | 11/2010 | Dwyer et al. ............... 455/436 |

FOREIGN PATENT DOCUMENTS

| | | |
|---|---|---|
| CN | 101185278 A | 5/2008 |
| CN | 101204050 A | 6/2008 |
| CN | 101611570 A | 12/2009 |
| WO | 0237692 A2 | 5/2002 |
| WO | 2007005725 A2 | 1/2007 |
| WO | 2009053944 A2 | 4/2009 |
| WO | 2009054702 A1 | 4/2009 |

OTHER PUBLICATIONS

3GPP TS 36.211 V8.8.0 (Sep. 2009); 3rd Generation Partnership Project; Technical Specification Group Radio Access Network; Evolved Universal Terrestrial Radio Access (E-UTRA); Physical Channels and Modulation (Release 8); pp. 1-83.

3GPP TS 36.331 V8.7.0 (Sep. 2009); 3rd Generation Partnership Project; Technical Specifaction Group Radio Access Network; Evolved Universal Terrestrial Radio Access (E-UTRA); Radio Resource Control (RRC); Protocol Specification (Release 8); pp. 1-208.

(Continued)

*Primary Examiner* — Patrick Edouard
*Assistant Examiner* — Julio Perez

(57) ABSTRACT

In various embodiments, a radio base station may be provided. The radio base station may include a transceiver configured to communicate with a radio communication device using a plurality of component carriers; and a message generator configured to generate an idle mode message including an information item related to at least one of the component carriers of the plurality of component carriers of the radio base station. The transceiver may further be configured to transmit the generated idle mode message to the radio communication device.

12 Claims, 7 Drawing Sheets

(56) References Cited

OTHER PUBLICATIONS

3GPP TS 36.304 V8.7.0 (Sep. 2009); 3rd Generation Partnership Project; Technical Specification Group Radio Access Network; Evolved Universal Terrestrial Radio Access (E-UTRA); User Equipment (UE) procedures in idle mode (Release 8); pp. 1-31.

3GPP TR 36.913 V8.0.1 (Mar. 2009); 3rd Generation Partnership Project; Technical Specification Group Radio Access Network; Requirements for further advancements for Evolved Universal Terrestrial Radio Access (E-UTRA) (LTE-Advanced) (Release 8); pp. 1-15.

3GPP TR 36.814 V1.3.0 (Jun. 2009); 3rd Generation Partnership Project; Technical Specification Group Radio Access Network; Further Advancements for E-UTRA Physical Layer Aspects (Release 9); pp. 1-47.

3GPP TSG RAN #39, RP-080137; NTT DoCoMo: Proposed SID on LTE-Advanced; Mar. 4-7, 2008; Puerto Vallarta, Mexico; pp. 1-5.

English language abstract of CN 101185278A dated May 21, 2008.

\* cited by examiner

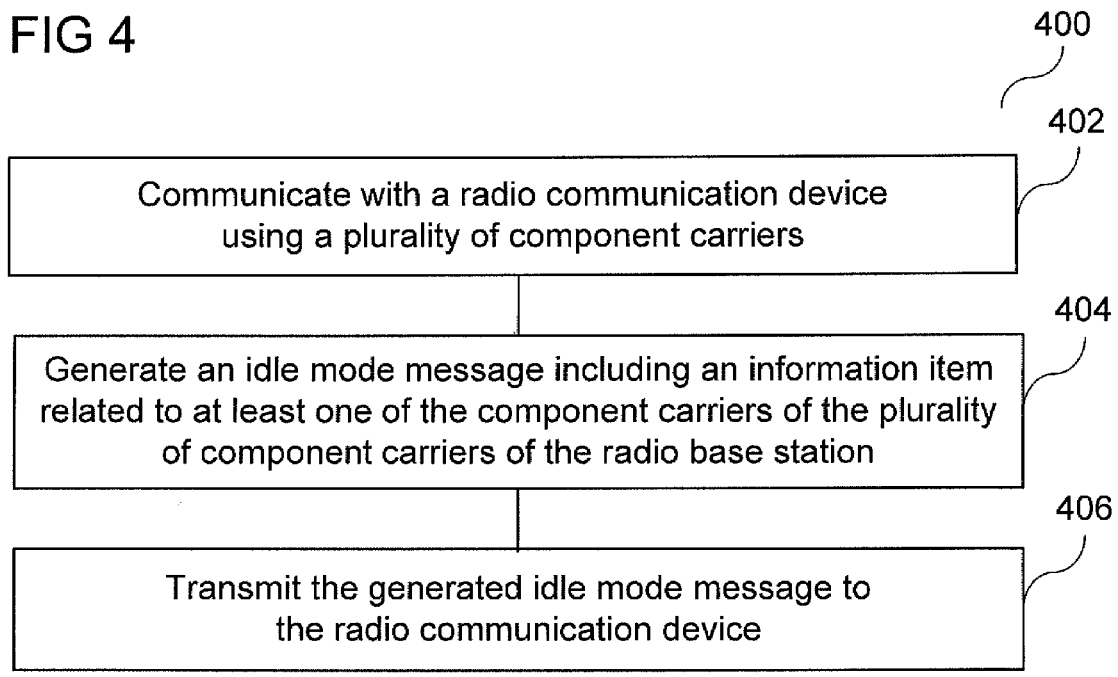
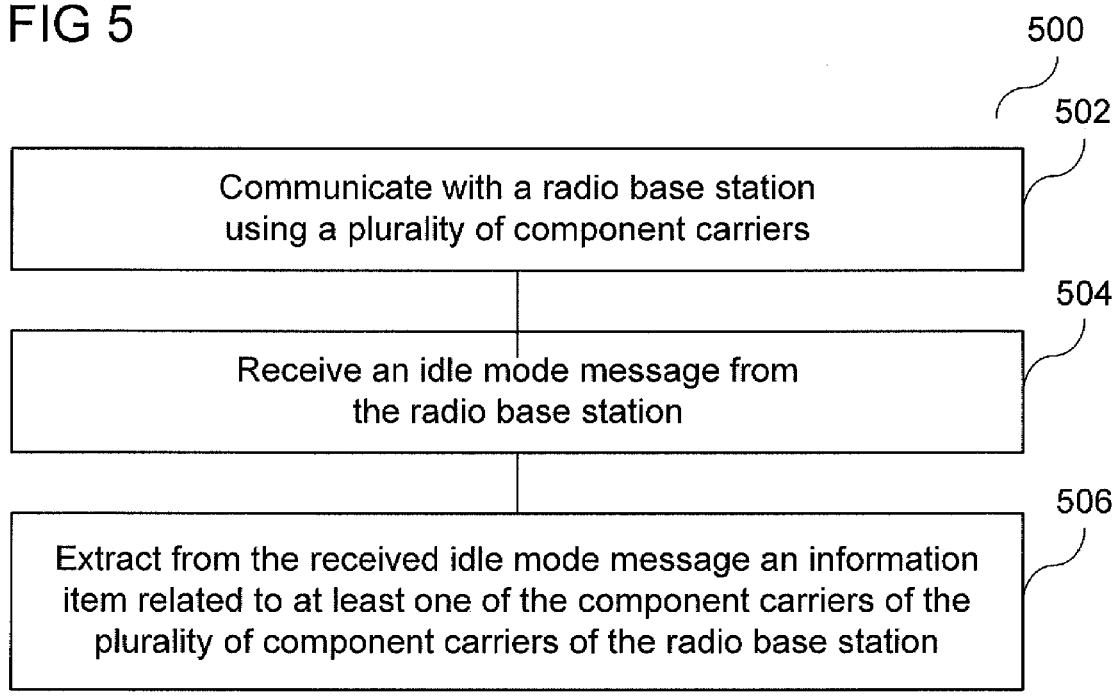

RADIO BASE STATIONS, RADIO COMMUNICATION DEVICES, METHODS FOR CONTROLLING A RADIO BASE STATION, AND METHODS FOR CONTROLLING A RADIO COMMUNICATION DEVICE

TECHNICAL FIELD

Various embodiments relate generally to radio base stations, radio communication devices, methods for controlling a radio base station and methods for controlling a radio communication device.

BACKGROUND

In LTE-Advanced (Long Term Evolution Advanced) support of bandwidths of more than 20 MHz and up to 100 MHz may be provided by spectrum aggregation, i.e. the bandwidth of an LTE-Advanced (LTE-A) radio cell may be composed of a number of so-called component carriers (CC), where the bandwidth size of each component carrier may be limited, for example to a maximum of 20 MHz. The component carriers may be adjacent or non-adjacent, and in FDD (Frequency-division duplexing) mode, asymmetric allocation of DL (downlink) and UL (uplink) component carriers may be considered, i.e. different number of component carriers of different bandwidths in UL and DL. An LTE-A radio communication device, for example a UE (user equipment) may simultaneously receive or transmit on one or multiple component carriers depending on its RF (radio frequency) capabilities.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 4 shows a flow diagram illustrating a method for controlling a radio base station in accordance with an embodiment;

FIG. 5 shows a flow diagram illustrating a method for controlling a radio communication device in accordance with an embodiment;

DESCRIPTION

Figure 1:
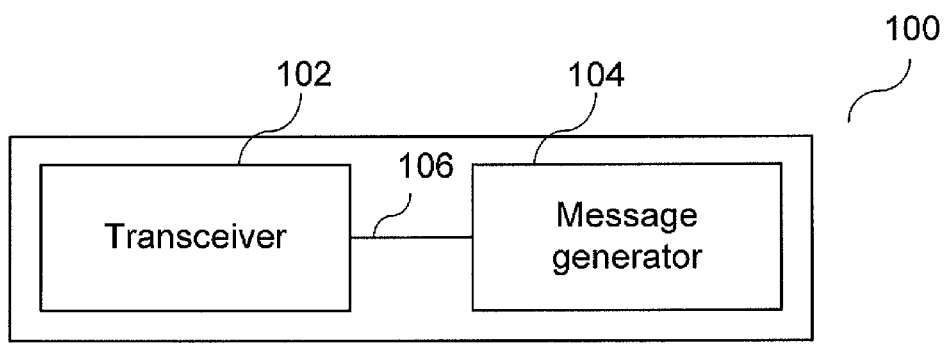
FIG. 1 shows a radio base station in accordance with an embodiment.

In various embodiments, a radio base station and a radio communication device may communicate using a plurality of component carriers, as will be explained in more detail below. In various embodiments, a radio communication device may receive from a base station information about at least one component carrier. In various embodiments, the radio communication device may base a selection of a component carrier to camp on in idle mode or to connect to in connected mode based on the received information.

The following detailed description refers to the accompanying drawings that show, by way of illustration, specific details and embodiments in which the invention may be practiced. Other embodiments may be utilized and structural, logical, and electrical changes may be made without departing from the scope of the invention. The various embodiments are not necessarily mutually exclusive, as some embodiments can be combined with one or more other embodiments to form new embodiments. The following detailed description therefore, is not to be taken in a limiting sense, and the scope of the present invention is defined by the appended claims.

The word "exemplary" is used herein to mean "serving as an example, instance, or illustration". Any embodiment or design described herein as "exemplary" is not necessarily to be construed as preferred or advantageous over other embodiments or designs.

A radio communication device according to various embodiments may be a device configured for wireless communication. In various embodiments, a radio communication device may be an end-user mobile device (MD). In various embodiments, a radio communication device may be any kind of mobile radio communication device, mobile telephone, personal digital assistant, mobile computer, or any other mobile device configured for communication with a mobile communication base station or an access point and may be also referred to as a User Equipment (UE), a mobile station (MS) or an advanced mobile station (advanced MS, AMS), for example in accordance with IEEE 802.16m.

A radio communication device according to various embodiments may include a memory which is for example used in the processing carried out by the end-user mobile devices. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

A radio base station according to various embodiments may include a memory which is for example used in the processing carried out by the radio base station. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

The terms "coupling" or "connection" are intended to include a direct "coupling" or direct "connection" as well as an indirect "coupling" or indirect "connection", respectively.

The term "protocol" is intended to include any piece of software that is provided to implement part of any layer of the communication definition. "Protocol" may include the functionality of one or more of the following layers: physical layer (layer 1), data link layer (layer 2), network layer (layer 3), or any other sub-layer of the mentioned layers or any upper layer.

Various embodiments are provided for devices, and various embodiments are provided for methods. It will be understood that basic properties of the devices also hold for the methods and vice versa. Therefore, for sake of brevity, duplicate description of such properties may be omitted.

In various embodiments, a (radio) resource of one or more (radio) resources will be understood as for example transmission frequency, transmission modulation scheme, transmission code, and/or transmission time slot, or any other feature of a transmitted signal.

It will be understood that communicating with a specific device may include transmitting and receiving data to and from the specific device.

Although various embodiments are described for a radio communication device in idle mode, it will be understood that the radio communication device may be in any other mode, for example in a connected mode. In various embodiments, the idle mode may be an RRC (radio resource control) idle mode, and the connected mode may be an RRC connected mode.

Although various embodiments are described for an idle mode message, it will be understood that the message may be a message of any other mode, for example in a connected mode message. In various embodiments, an idle mode message may be a message that is generated for being sent to a device in idle mode.

FIG. 1 shows a radio base station 100 in accordance with an embodiment. The radio base station 100 may include a transceiver 102 configured to communicate with a radio communication device (not shown in FIG. 1) using a plurality of component carriers; and a message generator 104 configured to generate an idle mode message including an information item related to at least one of the component carriers of the plurality of component carriers of the radio base station 100. The transceiver 102 may further be configured to transmit the generated idle mode message to the radio communication device. The transceiver 102 and the message generator 104 may be coupled with each other, e.g. via an electrical connection 106 such as e.g. a cable or a computer bus or via any other suitable electrical connection to exchange electrical signals.

In various embodiments, the radio communication device may be in idle mode. An idle mode of a radio communication device will be explained further below in more detail.

In various embodiments, each of the plurality of component carrier may consist of a pre-defined frequency band.

In various embodiments, the plurality of component carriers may be contiguous.

In various embodiments, the plurality of component carriers may be non-contiguous.

In various embodiments, at least one of the plurality of component carriers may consist of a frequency band with a bandwidth equal to or less than 50 MHz, e.g. of a frequency band with a bandwidth equal to or less than 40 MHz, e.g. of a frequency band with a bandwidth equal to or less than 20 MHz.

In various embodiments, the sum of bandwidths of the bands of the plurality of component carriers may be equal to or less than 500 MHz, e.g. equal to or less than 200 MHz, e.g. equal to or less than 100 MHz.

In various embodiments, the sum of bandwidths of the bands of the plurality of component carriers may be equal to or less than 100 MHz, e.g. equal to or less than 60 MHz, e.g. equal to or less than 40 MHz.

In various embodiments, the plurality of component carriers may be arranged on a single frequency band.

In various embodiments, the plurality of component carriers may be arranged on multiple frequency bands.

In various embodiments, the transceiver may further be configured to transmit the generated idle mode message to the radio communication device using a pre-defined component carrier.

In various embodiments, the information item may be related to at least the pre-defined component carrier.

In various embodiments, the information item may include reservation information indicating whether the radio communication device is allowed to camp on the pre-defined component carrier.

In various embodiments, the reservation information may include one of a value "barred" for indicating that the radio communication device is not allowed to camp on the pre-defined component carrier and a value "not barred" for indicating that the radio communication device is allowed to camp on the pre-defined component carrier.

In various embodiments, the information item may include cell selection/reselection prioritization information indicating which one of cell selection/reselection and component carrier selection has higher priority for the radio communication device when leaving the pre-defined component carrier.

In various embodiments, the cell selection/reselection prioritization information may include one of a value "yes" indicating that cell selection/reselection has higher priority than component carrier selection for the radio communication device when leaving the pre-defined component carrier and a value "no" indicating that cell selection/reselection has lower priority than component carrier selection for the radio communication device when leaving the pre-defined component carrier.

In various embodiments, the information item may be related to at least one component carrier different from the pre-defined component carrier.

In various embodiments, the information item may include allowed component carrier information indicating at least one component carrier as a candidate for component carrier selection for the radio communication device.

In various embodiments, the allowed component carrier information may include information of one to two component carriers as candidates for component carrier selection for the radio communication device.

In various embodiments, the allowed component carrier information may include a list including information of a plurality of component carriers as candidates for component carrier selection for the radio communication device.

In various embodiments, at least one component carrier as a candidate for component carrier selection for the radio communication device may be represented by at least one of a frequency band in which at least one the component carrier is located and a frequency distance between the center frequency of the at least one component carrier and the predefined component carrier.

In various embodiments, the transceiver 102 may further be configured to broadcast the generated idle mode message to the radio communication device.

In various embodiments, the transceiver 102 may further be configured to broadcast the generated idle mode message to the radio communication device on a broadcast channel.

In various embodiments, the transceiver 102 may further be configured to broadcast the generated idle mode message to the radio communication device on a physical broadcast channel.

In various embodiments, the transceiver 102 may further be configured to transmit the generated idle mode message to the radio communication device using a system information message.

In various embodiments, the transceiver 102 may further be configured to transmit the generated idle mode message to the radio communication device using a system information block.

In various embodiments, the transceiver 102 may be further configured to transmit and receive signals according to at least one radio communication technology of one of the following radio communication technology families:
- a Short Range radio communication technology family;
- a Metropolitan Area System radio communication technology family;
- a Cellular Wide Area radio communication technology family;
- a radio communication technology family which includes a radio communication technology in which the access to radio resources is provided in a random manner; and
- a radio communication technology family which includes a radio communication technology in which the access to radio resources is provided in a centrally controlled manner In various embodiments, the transceiver 102 may be further configured to transmit and receive signals according to at least one of the following radio communication technologies: a Bluetooth radio communication technology, an Ultra Wide Band (UWB) radio communication technology, a Wireless Local Area Network radio communication technology (e.g. according to an IEEE 802.11 (e.g. IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11 VHT (VHT=Very High Throughput), e.g. IEEE 802.11 ac for VHT below 6 GHz and IEEE 802.11 ad for VHT at 60 GHz, a Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network), IEEE 802.16m Advanced Air Interface, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (long term Evolution), 3GPP LTE Advanced (long term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (long term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), PHS (Personal Handy-phone System), WiDEN (Wideband Integrated Digital Enhanced Network), iBurst, and Unlicensed Mobile Access (UMA, also referred to as 3GPP Generic Access Network, or GAN standard)).

Figure 2:
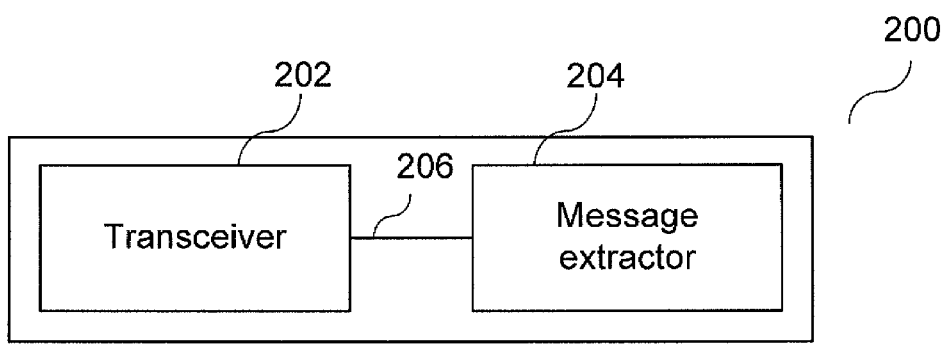
FIG. 2 shows a radio communication device in accordance with an embodiment.

FIG. 2 shows a radio communication device 200 in accordance with an embodiment. The radio communication device 200 may include a transceiver 202 configured to communicate with a radio base station (not shown in FIG. 2) using a plurality of component carriers. The transceiver 202 may further be configured to receive an idle mode message from the radio base station. The radio communication device 200 may further include a message extractor 204 configured to extract from the received idle mode message an information item related to at least one of the component carriers of the plurality of component carriers of the radio base station. The transceiver 202 and the message extractor 204 may be coupled with each other, e.g. via an electrical connection 206 such as e.g. a cable or a computer bus or via any other suitable electrical connection to exchange electrical signals.

In various embodiments, the radio communication device may be in idle mode.

In various embodiments, each of the plurality of component carrier may consist of a pre-defined frequency band.

In various embodiments, the plurality of component carriers may be contiguous.

In various embodiments, the plurality of component carriers may be non-contiguous.

In various embodiments, at least one of the plurality of component carriers may consist of a frequency band with a bandwidth equal to or less than 50 MHz, e.g. of a frequency band with a bandwidth equal to or less than 40 MHz, e.g. of a frequency band with a bandwidth equal to or less than 20 MHz.

In various embodiments, the sum of bandwidths of the bands of the plurality of component carriers may be equal to or less than 500 MHz, e.g. equal to or less than 200 MHz, e.g. equal to or less than 100 MHz.

In various embodiments, the sum of bandwidths of the bands of the plurality of component carriers may be equal to or less than 100 MHz, e.g. equal to or less than 60 MHz, e.g. equal to or less than 40 MHz.

In various embodiments, the plurality of component carriers may be arranged on a single frequency band.

In various embodiments, the plurality of component carriers may be arranged on multiple frequency bands.

In various embodiments, the transceiver 202 may further be configured to receive the idle mode message from the radio base station using a pre-defined component carrier.

In various embodiments, the information item may be related to at least the pre-defined component carrier.

In various embodiments, the information item may include reservation information indicating whether the radio communication device 200 is allowed to camp on the pre-defined component carrier.

In various embodiments, the reservation information may include one of a value "barred" for indicating that the radio communication device 200 is not allowed to camp on the pre-defined component carrier and a value "not barred" for indicating that the radio communication device 200 is allowed to camp on the pre-defined component carrier.

Figure 3:
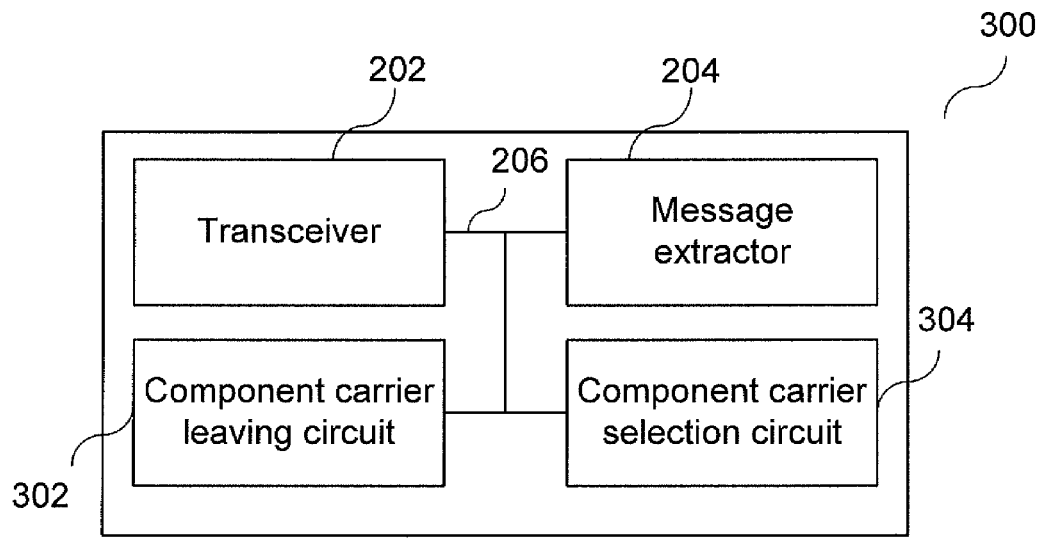
FIG. 3 shows a radio communication device in accordance with an embodiment.

FIG. 3 shows a radio communication device 300 in accordance with an embodiment.

Similar to the radio communication device 200 shown in FIG. 2, the radio communication device 300 may include a transceiver 202 configured to communicate with a radio base station (not shown in FIG. 3) using a plurality of component carriers, wherein the transceiver 202 may further be configured to receive an idle mode message from the radio base station, and a message extractor 204 configured to extract from the received idle mode message an information item related to at least one of the component carriers of the plurality of component carriers of the radio base station. The radio communication device 300 may further include a component carrier leaving circuit 302 as will be explained in more detail below and a component carrier selection circuit 304 as will be explained below. The transceiver 202, the message extractor 204, the component carrier leaving circuit 302 and the component carrier selection circuit 304 may be coupled with each other, e.g. via an electrical connection 206 such as e.g. a cable or a computer bus or via any other suitable electrical connection to exchange electrical signals.

In various embodiments, the information item may include cell selection/reselection prioritization information indicating which one of cell selection/reselection and component carrier selection has higher priority for the radio communication device 300 when leaving the pre-defined component carrier.

In various embodiments, the component carrier leaving circuit 302 may be configured to perform one of cell selection/reselection and component carrier selection based on the cell selection/reselection prioritization information.

In various embodiments, the cell selection/reselection prioritization information may include one of a value "yes" indicating that cell selection/reselection has higher priority than component carrier selection for the radio communication device 300 when leaving the pre-defined component carrier and a value "no" indicating that cell selection/reselection has lower priority than component carrier selection for the radio communication device 300 when leaving the pre-defined component carrier.

In various embodiments, the component carrier leaving circuit 302 may be configured to perform cell selection/reselection in case the selection/reselection prioritization information has the value "yes", and to perform component carrier selection in case the selection/reselection prioritization information has the value "no".

In various embodiments, the information item may be related to at least one component carrier different from the pre-defined component carrier.

In various embodiments, the information item may include allowed component carrier information indicating at least one component carrier as a candidate for component carrier selection for the radio communication device 300.

In various embodiments, the component carrier selection circuit 304 may be configured to select a component carrier based on the allowed component carrier information.

In various embodiments, the allowed component carrier information may include information of one to two component carriers as candidates for component carrier selection for the radio communication device 300.

In various embodiments, the allowed component carrier information may include a list including information of a plurality of component carriers as candidates for component carrier selection for the radio communication device 300.

In various embodiments, at least one component carrier as a candidate for component carrier selection for the radio communication device 300 may be represented by at least one of a frequency band in which the at least one component carrier is located and a frequency distance between the center frequency of the at least one component carrier and the pre-defined component carrier.

In various embodiments, the transceiver 202 may further be configured to receive the idle mode message from the radio base station by broadcast.

In various embodiments, the transceiver 202 may further be configured to receive the idle mode message from the radio base station on a broadcast channel.

In various embodiments, the transceiver 202 may further be configured to receive the idle mode message from the radio base station on a physical broadcast channel.

In various embodiments, the transceiver 202 may further be configured to receive the idle mode message from the radio base station using a system information message.

In various embodiments, the transceiver 202 may further be configured to receive the idle mode message from the radio base station using a system information block.

In various embodiments, the transceiver 202 may be further configured to transmit and receive signals according to at least one radio communication technology of one of the following radio communication technology families:

a Short Range radio communication technology family;
a Metropolitan Area System radio communication technology family;
a Cellular Wide Area radio communication technology family;
a radio communication technology family which includes a radio communication technology in which the access to radio resources is provided in a random manner; and
a radio communication technology family which includes a radio communication technology in which the access to radio resources is provided in a centrally controlled manner In various embodiments, the transceiver 202 may be further configured to transmit and receive signals according to at least one of the following radio communication technologies: a Bluetooth radio communication technology, an Ultra Wide Band (UWB) radio communication technology, a Wireless Local Area Network radio communication technology (e.g. according to an IEEE 802.11 (e.g. IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11 VHT (VHT=Very High Throughput), e.g. IEEE 802.11 ac for VHT below 6 GHz and IEEE 802.11 ad for VHT at 60 GHz, a Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network), IEEE 802.16m Advanced Air Interface, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (long term Evolution), 3GPP LTE Advanced (long term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (long term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), PHS (Personal Handy-phone System), WiDEN (Wideband Integrated Digital Enhanced Network), iBurst, and Unlicensed Mobile Access (UMA, also referred to as 3GPP Generic Access Network, or GAN standard)).

FIG. 4 shows a flow diagram 400 illustrating a method for controlling a radio base station in accordance with an embodiment. In 402, it may communicate with a radio communication device using a plurality of component carriers. In 404, an idle mode message including an information item related to at least one of the component carriers of the plurality of component carriers of the radio base station may be generated. In 406, the generated idle mode message may be transmitted to the radio communication device.

In various embodiments, the radio communication device may be in idle mode.

In various embodiments, each of the plurality of component carrier may consist of a pre-defined frequency band.

In various embodiments, the plurality of component carriers may be contiguous.

In various embodiments, the plurality of component carriers may be non-contiguous.

In various embodiments, at least one of the plurality of component carriers may consist of a frequency band with a bandwidth equal to or less than 50 MHz, e.g. of a frequency band with a bandwidth equal to or less than 40 MHz, e.g. of a frequency band with a bandwidth equal to or less than 20 MHz.

In various embodiments, the sum of bandwidths of the bands of the plurality of component carriers may be equal to or less than 500 MHz, e.g. equal to or less than 200 MHz, e.g. equal to or less than 100 MHz.

In various embodiments, the sum of bandwidths of the bands of the plurality of component carriers may be equal to or less than 100 MHz, e.g. equal to or less than 60 MHz, e.g. equal to or less than 40 MHz.

In various embodiments, the plurality of component carriers may be arranged on a single frequency band.

In various embodiments, the plurality of component carriers may be arranged on multiple frequency bands.

In various embodiments, the generated idle mode message may be transmitted to the radio communication device using a pre-defined component carrier.

In various embodiments, the information item may be related to at least the pre-defined component carrier.

In various embodiments, the information item may include reservation information indicating whether the radio communication device is allowed to camp on the pre-defined component carrier.

In various embodiments, the reservation information may include one of a value "barred" for indicating that the radio communication device is not allowed to camp on the pre-defined component carrier and a value "not barred" for indicating that the radio communication device is allowed to camp on the pre-defined component carrier.

In various embodiments, the information item may include cell selection/reselection prioritization information indicating which one of cell selection/reselection and component carrier selection has higher priority for the radio communication device when leaving the pre-defined component carrier.

In various embodiments, the cell selection/reselection prioritization information may include one of a value "yes" indicating that cell selection/reselection has higher priority than component carrier selection for the radio communication device when leaving the pre-defined component carrier and a value "no" indicating that cell selection/reselection has lower priority than component carrier selection for the radio communication device when leaving the pre-defined component carrier.

In various embodiments, the information item may be related to at least one component carrier different from the pre-defined component carrier.

In various embodiments, the information item may include allowed component carrier information indicating at least one component carrier as a candidate for component carrier selection for the radio communication device.

In various embodiments, the allowed component carrier information may include information of one to two component carriers as candidates for component carrier selection for the radio communication device.

In various embodiments, the allowed component carrier information may include a list including information of a plurality of component carriers as candidates for component carrier selection for the radio communication device.

In various embodiments, at least one component carrier as a candidate for component carrier selection for the radio communication device may be represented by at least one of a frequency band in which the at least one component carrier is located and a frequency distance between the center frequency of the at least one component carrier and the pre-defined component carrier.

In various embodiments, the generated idle mode message may be broadcasted to the radio communication device.

In various embodiments, the generated idle mode message may be broadcasted to the radio communication device on a broadcast channel.

In various embodiments, the generated idle mode message may be broadcasted to the radio communication device on a physical broadcast channel.

In various embodiments, the generated idle mode message may be transmitted to the radio communication device using a system information message.

In various embodiments, the generated idle mode message may be transmitted to the radio communication device using a system information block.

FIG. 5 shows a flow diagram 500 illustrating a method for controlling a radio communication device in accordance with an embodiment. In 502, it may communicate with a radio base station using a plurality of component carriers. In 504, an idle mode message from the radio base station may be received. In 506, an information item related to at least one of the component carriers of the plurality of component carriers of the radio base station may be extracted from the received idle mode message.

In various embodiments, the radio communication device may be in idle mode.

In various embodiments, each of the plurality of component carrier may consist of a pre-defined frequency band.

In various embodiments, the plurality of component carriers may be contiguous.

In various embodiments, the plurality of component carriers may be non-contiguous.

In various embodiments, at least one of the plurality of component carriers may consist of a frequency band with a bandwidth equal to or less than 50 MHz, e.g. of a frequency band with a bandwidth equal to or less than 40 MHz, e.g. of a frequency band with a bandwidth equal to or less than 20 MHz.

In various embodiments, the sum of bandwidths of the bands of the plurality of component carriers may be equal to or less than 500 MHz, e.g. equal to or less than 200 MHz, e.g. equal to or less than 100 MHz.

In various embodiments, the sum of bandwidths of the bands of the plurality of component carriers may be equal to or less than 100 MHz, e.g. equal to or less than 60 MHz, e.g. equal to or less than 40 MHz.

In various embodiments, the plurality of component carriers may be arranged on a single frequency band.

In various embodiments, the plurality of component carriers may be arranged on multiple frequency bands.

In various embodiments, the idle mode message may be received from the radio base station using a pre-defined component carrier.

In various embodiments, the information item may be related to at least the pre-defined component carrier.

In various embodiments, the information item may include reservation information indicating whether the radio communication device is allowed to camp on the pre-defined component carrier.

In various embodiments, the reservation information may include one of a value "barred" for indicating that the radio communication device is not allowed to camp on the pre-defined component carrier and a value "not barred" for indicating that the radio communication device is allowed to camp on the pre-defined component carrier.

In various embodiments, the information item may include cell selection/reselection prioritization information indicating which one of cell selection/reselection and component carrier selection has higher priority for the radio communication device when leaving the pre-defined component carrier.

In various embodiments, one of cell selection/reselection and component carrier selection may be performed based on the cell selection/reselection prioritization information.

In various embodiments, the cell selection/reselection prioritization information may include one of a value "yes" indicating that cell selection/reselection has higher priority than component carrier selection for the radio communication device when leaving the pre-defined component carrier and a value "no" indicating that cell selection/reselection has lower priority than component carrier selection for the radio communication device when leaving the pre-defined component carrier.

In various embodiments, the information item may be related to at least one component carrier different from the pre-defined component carrier.

In various embodiments, the information item may include allowed component carrier information indicating at least one component carrier as a candidate for component carrier selection for the radio communication device.

In various embodiments, a component carrier may be selected based on the allowed component carrier information.

In various embodiments, the allowed component carrier information may include information of one to two component carriers as candidates for component carrier selection for the radio communication device.

In various embodiments, the allowed component carrier information may include a list including information of a plurality of component carriers as candidates for component carrier selection for the radio communication device.

In various embodiments, at least one component carrier as a candidate for component carrier selection for the radio communication device may be represented by at least one of a frequency band in which the at least one component carrier is located and a frequency distance between the center frequency of the at least one component carrier and the pre-defined component carrier.

In various embodiments, the idle mode message may be received from the radio base station by broadcast.

In various embodiments, the idle mode message may be received from the radio base station on a broadcast channel.

In various embodiments, the idle mode message may be received from the radio base station on a physical broadcast channel.

In various embodiments, the idle mode message may be received from the radio base station using a system information message.

In various embodiments, the idle mode message may be received from the radio base station using a system information block.

In various embodiments, a radio base station may be provided. The radio base station may include a transceiver configured to transmit and receive data to and from a radio communication device using a plurality of component carriers. In various embodiments, the transceiver may further be configured to transmit to the radio communication device a message including at least one information item selected from a list of information items consisting of an information item including reservation information indicating whether the radio communication device is allowed to camp on a pre-defined component carrier; an information item including cell selection/reselection prioritization information indicating which one of cell selection/reselection and component carrier selection has higher priority for the radio communication device when leaving a pre-defined component carrier; and an information item including allowed component carrier information indicating at least one component carrier as a candidate for component carrier selection for the radio communication device.

In various embodiments, a radio communication device may be provided. The radio communication device may include a transceiver configured to transmit and receive data to and from a radio base station using a plurality of component carriers. In various embodiments, the transceiver may further be configured to receive from the radio base station a message including at least one information item selected from a list of information items consisting of an information item including reservation information indicating whether the radio communication device is allowed to camp on a pre-defined component carrier; an information item including cell selection/reselection prioritization information indicating which one of cell selection/reselection and component carrier selection has higher priority for the radio communication device when leaving a pre-defined component carrier; and an information item including allowed component carrier information indicating at least one component carrier as a candidate for component carrier selection for the radio communication device.

In various embodiments, a method for controlling a radio base station may be provided. The method may include transmitting and receiving data to and from a radio communication device using a plurality of component carriers. In various embodiments, a message may be transmitted to the radio communication device, the message including at least one information item selected from a list of information items consisting of an information item including reservation information indicating whether the radio communication device is allowed to camp on a pre-defined component carrier; an information item including cell selection/reselection prioritization information indicating which one of cell selection/reselection and component carrier selection has higher priority for the radio communication device when leaving a pre-defined component carrier; and an information item including allowed component carrier information indicating at least one component carrier as a candidate for component carrier selection for the radio communication device.

In various embodiments, a method for controlling a radio communication device may be provided. The method may include transmitting and receiving data to and from a radio base station using a plurality of component carriers. In various embodiments, a message may be received from the radio base station, the message including at least one information item selected from a list of information items consisting of an information item including reservation information indicating whether the radio communication device is allowed to camp on a pre-defined component carrier; an information item including cell selection/reselection prioritization information indicating which one of cell selection/reselection and component carrier selection has higher priority for the radio communication device when leaving a pre-defined component carrier; and an information item including allowed component carrier information indicating at least one component carrier as a candidate for component carrier selection for the radio communication device.

In various embodiments, a radio base station may be provided. The radio base station may include a transceiver configured to transmit and receive data to and from a radio communication device using a plurality of component carriers. The radio base station may further include a message generator configured to generate an idle mode message including component carrier change information defining a behavior of the radio communication device for changing component carrier from one of the plurality of component carriers of the mobile radio base station. In various embodiments, the transceiver may further be configured to transmit the generated idle mode message to the radio communication device.

In various embodiments, a radio communication device may be provided. The radio communication device may include a transceiver configured to transmit and receive data to and from a radio base station using a plurality of component carriers. In various embodiments, the transceiver may further be configured to receive an idle mode message from the radio base station. The radio base communication device may further include a message extractor configured to extract from the idle mode message component carrier change information defining a behavior of the radio communication device for changing component carrier from one of the plurality of component carriers of the mobile radio base station.

In various embodiments, a method for controlling a radio base station may be provided. The method may include transmitting and receiving data to and from a radio communication device using a plurality of component carriers. The method may further include generating an idle mode message including component carrier change information defining a behavior of the radio communication device for changing component carrier from one of the plurality of component carriers of the mobile radio base station. In various embodiments, the method may further include transmitting the generated idle mode message to the radio communication device.

In various embodiments, a method for controlling a radio communication device may be provided. The method may include transmitting and receiving data to and from a radio base station using a plurality of component carriers. In various embodiments, the method may further include receiving an idle mode message from the radio base station. The method may further include extracting from the idle mode message component carrier change information defining a behavior of the radio communication device for changing component carrier from one of the plurality of component carriers of the mobile radio base station.

In accordance with various embodiments, methods for component carrier selection in an LTE-Advanced communication system may be provided.

In accordance with the 3GPP (Third Generation Partnership Project) standardization for a, further advancements of LTE (Long Term Evolution), also referred to as LTE-Advanced, may be provided. In accordance with LTE-Advanced, bandwidths larger than a lower threshold, for example larger than 20 MHz, and up to an upper threshold, for example up to 100 MHz, may be supported by spectrum aggregation, i.e. the bandwidth of an LTE-Advanced (LTE-A) radio cell may be composed of a number of so-called component carriers (CC), in where the bandwidth size of each component carrier may be limited to a maximum value, for example to a maximum value of 20 MHz. The component carriers may be adjacent or non-adjacent, and in FDD (frequency division duplex) mode asymmetric allocation of DL (downlink) and UL (uplink) component carriers may be considered, i.e. different number of component carriers of different bandwidths in UL and DL. An LTE-A UE may simultaneously receive or transmit on one or multiple component carriers depending on its RF capabilities. Due to technical constraints, the RF TX/RX capability of LTE-A UEs may be lower than an upper value, for example lower than 100 MHz, or lower than 40 MHz. Furthermore, an LTE-A radio cell may be desired to be backward compatible to Release 8 (Rel-8) LTE UEs with RF (radio-frequency) TX (transmission)/RX (reception) capability of 20 MHz, for example at least one of the component carriers may be desired to be configured/operated Rel-8 LTE-compliant.

Figure 6:
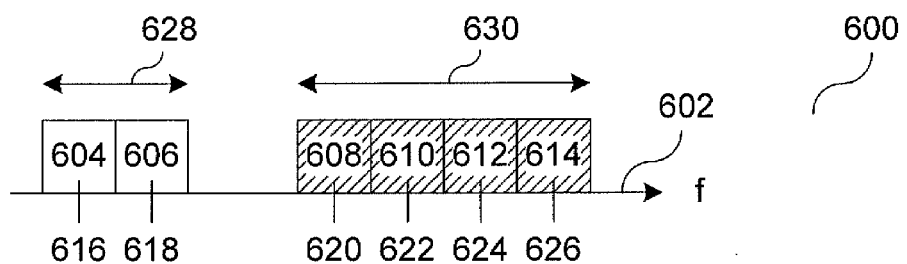
FIG. 6 shows a radio frequency deployment scenario in accordance with an embodiment.
Figure 7:
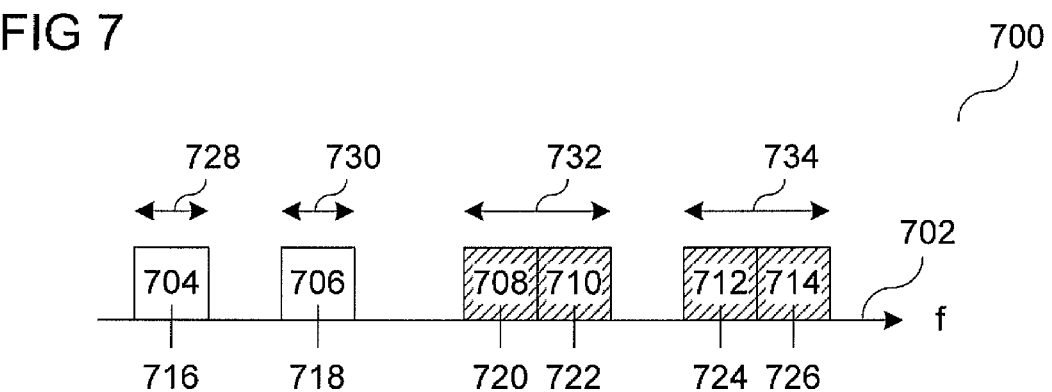
FIG. 7 shows a radio frequency deployment scenario in accordance with an embodiment.
Figure 8:
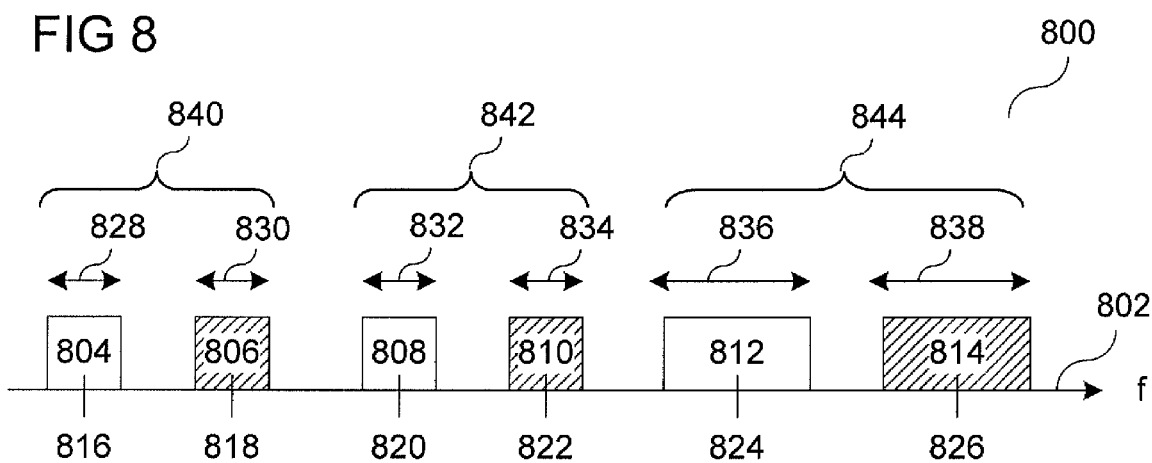
FIG. 8 shows a radio frequency deployment scenario in accordance with an embodiment.

FIG. 6, FIG. 7 and FIG. 8 show RF deployment scenarios for an LTE-A radio cell operating in FDD mode in accordance with various embodiments.

FIG. 6 shows a radio frequency deployment scenario 600 in accordance with an embodiment. For example, the deployment scenario 600 may depict a single band, contiguous and asymmetric RF deployment scenario in UL/DL, wherein the bandwidth size of each component carrier may be 20 MHz. The UL may be composed of two adjacent component carriers specified by the respective carrier frequencies. The DL may be composed of four adjacent component carriers specified by the respective carrier frequencies.

By way of example, for illustration purposes, component carriers are shown over the frequency axis 602. Component carriers related to uplink are shown as white boxes in FIG. 6, while component carriers related to downlink are shown as hatched boxes. For example, in uplink, overall 40 MHz may be allocated consisting of two adjacent component carriers, a first component carrier 604 and a second component carrier 606, specified by a first carrier frequency 616 and a second carrier frequency 618, respectively. The first component carrier 604 may have a first bandwidth of 20 MHz. The second component carrier 606 may have a second bandwidth of 20 MHz. The combination of the first component carrier 604 and the second component carrier 606 may have a combined bandwidth of 40 MHz as indicated by arrow 628. The first component carrier 604 and the second component carrier 606 may be contiguous, i.e. for example the respective bandwidths may be contiguous, i.e. for example the respective bandwidths may be arranged without frequency gaps in-between. In DL overall 80 MHz may be allocated consisting of four component carriers, a third component carrier 608, a fourth component carrier 610, a fifth component carrier 612 and a sixth component carrier 614. The third component carrier 608 may be specified by a third carrier frequency 602. The fourth component carrier 610 may be specified by a fourth carrier frequency 622. The fifth component carrier 612 may be specified by a fifth carrier frequency 624. The sixth component carrier 614 may be specified by a sixth carrier frequency 626. The third component carrier 608, the fourth component carrier 610, the fifth component carrier 612, and the sixth component carrier 614 may be contiguous, i.e. for example the respective bandwidths may be contiguous, i.e. for example the respective bandwidths may be arranged without frequency gaps in-between. The third component carrier 608, the fourth component carrier 610, the fifth component carrier 612, and the sixth component carrier 614 each may have a bandwidth of 20 MHz, so that a combined bandwidth of 80 MHz as indicated by arrow 630 may be provided. Each of the first component carrier 604, the second component carrier 606, the third component carrier 608, the fourth component carrier 610, the fifth component carrier 612, and the sixth component carrier 614 may be arranged on the same band, i.e. a single band scenario may be provided.

FIG. 7 shows a radio frequency deployment scenario 700 in accordance with an embodiment. For example, the deployment scenario 700 may depict a single band, non-contiguous and asymmetric RF deployment scenario in UL/DL, wherein the bandwidth size of each component carrier may be 20 MHz. The UL may be composed of two non-adjacent component carriers specified by the respective carrier frequencies. The DL may be composed of four non-adjacent component carriers specified by the respective carrier frequencies.

In particular, for illustration purposes, component carriers are shown over the frequency axis 702. Component carriers related to uplink are shown as white boxes in FIG. 7, while component carriers related to downlink are shown as hatched boxes. For example, in uplink, overall 40 MHz may be allocated consisting of two non-adjacent (in other words: non-contiguous) component carriers, a first component carrier 704 and a second component carrier 706, specified by a first carrier frequency 716 and a second carrier frequency 718, respectively. The first component carrier 704 may have a first bandwidth of 20 MHz as indicated by arrow 728. The second component carrier 706 may have a second bandwidth of 20 MHz as indicated by arrow 730. The first component carrier 704 and the second component carrier 706 may be non-contiguous, i.e. for example the respective bandwidths may be non-contiguous, i.e. for example the respective bandwidths may be arranged with a frequency gap in-between. In DL overall 80 MHz may be allocated consisting of four component carriers, a third component carrier 708, a fourth component carrier 710, a fifth component carrier 712 and a sixth component carrier 714. The third component carrier 708 may be specified by a third carrier frequency 720. The fourth component carrier 710 may be specified by a fourth carrier frequency 722. The fifth component carrier 712 may be specified by a fifth carrier frequency 724. The sixth component carrier 714 may be specified by a sixth carrier frequency 726. The third component carrier 708 and the fourth component carrier 710 may be contiguous (in other words adjacent). The fifth component carrier 712 and the sixth component carrier 714 may be contiguous (adjacent). However, the fourth component carrier 710 and the fifth component carrier 712 may be non-contiguous (non-adjacent), i.e. for example the respective bandwidths may be non contiguous, i.e. for example the respective bandwidths may be arranged with a frequency gap in-between. The third component carrier 708, the fourth component carrier 710, the fifth component carrier 712, and the sixth component carrier 714 each may have a bandwidth of 20 MHz, so that a combined bandwidth of 80 MHz may be provided by a combination of the third component carrier 708 and the fourth component carrier 710 providing a combined bandwidth of 40 MHz as indicated by arrow 732 and of the fifth component carrier 712 and the sixth component carrier 714 providing a combined bandwidth of 40 MHz as indicated by arrow 734. Each of the first component carrier 704, the second component carrier 706, the third component carrier 708, the fourth component carrier 710, the fifth component carrier 712, and the sixth component carrier 714 may be arranged on the same band, i.e. a single band scenario may be provided.

FIG. 8 shows a radio frequency deployment scenario 800 in accordance with an embodiment. For example, the deployment scenario 800 may depict a multi band, non-contiguous and asymmetric RF deployment scenario in UL/DL. The UL may be composed of three non-adjacent component carriers specified by the respective carrier frequencies. The DL may be composed of three non-adjacent component carriers specified by the respective carrier frequencies.

By way of example, for illustration purposes, component carriers are shown over the frequency axis 802. Component carriers related to uplink are shown as white boxes in FIG. 8, while component carriers related to downlink are shown as hatched boxes. For example, in uplink, overall 40 MHz may be allocated consisting of three non-adjacent (in other words: non-contiguous) component carriers, a first component carrier 804 specified by a first carrier frequency 816, a third component carrier 808 specified by a third carrier frequency 820, and a fifth component carrier 812 specified by a fifth carrier frequency 824, respectively. The first component carrier 804 may have a first bandwidth of 10 MHz as indicated by arrow 828. The third component carrier 808 may have a third bandwidth of 10 MHz as indicated by arrow 832. The fifth component carrier 812 may have a fifth bandwidth of 20 MHz as indicated by arrow 836. The first component carrier 804, the third component carrier 808 and the fifth component carrier 812 may be non-contiguous, i.e. for example the respective bandwidths may be non-contiguous, i.e. for example the respective bandwidths may be arranged with frequency gaps in-between. In DL overall 40 MHz may be allocated consisting of three component carriers, a second component carrier 806 specified by a second carrier frequency 818, a fourth component carrier 810 specified by a fourth carrier frequency 822, and a sixth component carrier 814 specified by a sixth carrier frequency 826. The second component carrier 806 may have a second bandwidth of 10 MHz as indicated by arrow 830. The fourth component carrier 810 may have a fourth bandwidth of 10 MHz as indicated by arrow 834. The sixth component carrier 814 may have a sixth bandwidth of 20 MHz as indicated by arrow 838. The second component carrier 806, the fourth component carrier 810 and the sixth component carrier 814 may be non-contiguous, i.e. for example the respective bandwidths may be non-contiguous, i.e. for example the respective bandwidths may be arranged with frequency gaps in-between. The first component carrier 804 and the second component carrier 806 may be provided on a first frequency band as indicated by bracket 840, for example on Band 3, for example on a 1.8 GHz band. The third component carrier 808 and the fourth component carrier 810 may be provided on a second frequency band as indicated by bracket 842, for example Band 1, for example on a 2.1 GHz band. The fifth component carrier 812 and the sixth component carrier 814 may be provided on a third frequency band as indicated by bracket 844, for example on Band 7, for example on a 2.6 GHz band.

Figure 9:
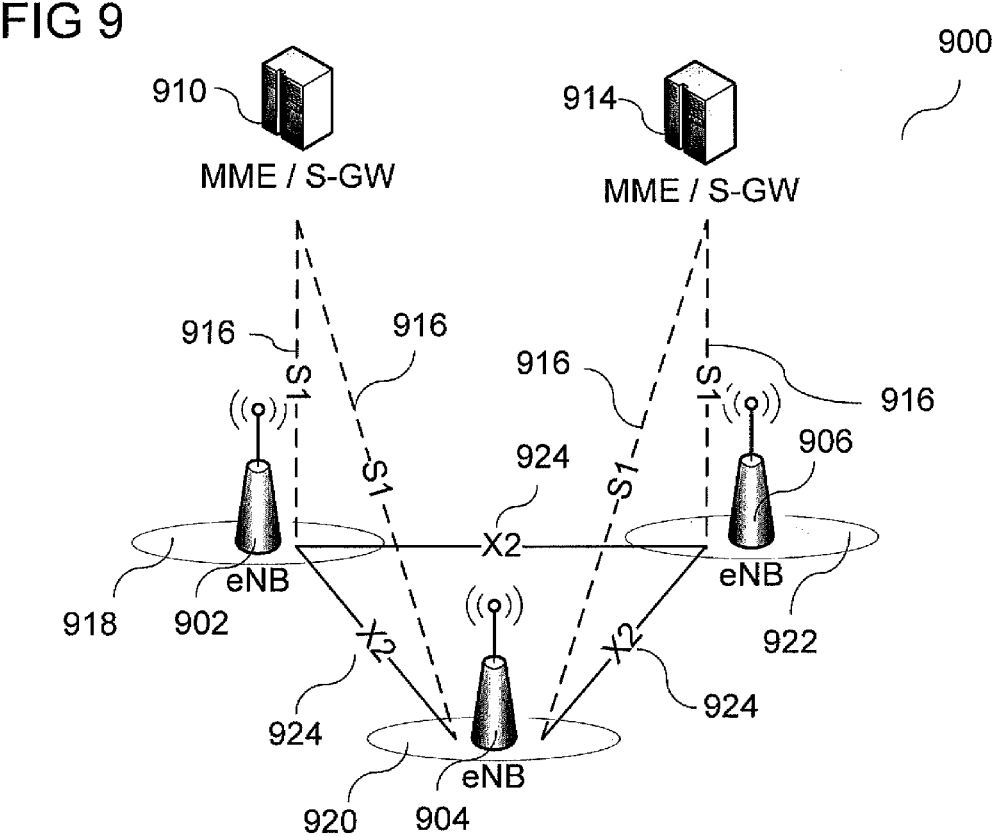
FIG. 9 shows a network architecture in accordance with an embodiment.

FIG. 9 shows an example E-UTRAN architecture 900 including three eNodeBs 902, 904, 906, two Evolved Packet Cores (EPCs), e.g. a first EPC (not shown), provided by a first operator A (not shown) and including a first MME/S-GW 910, and a second EPC (not shown), provided by a second operator B (not shown) and including a second MME/S-GW 914. In LTE, e.g. according to the LTE network architecture, as shown in the Logical E-UTRAN Architecture as defined by 3GPP shown in FIG. 9, the eNodeBs 902, 904, 906, may be interconnected with each other by means of the X2 interfaces 924. Furthermore, eNodeBs 902, 904, 906, may be connected by means of the S1 interfaces 916 to the MME/S-GW 910, 914, of the respective first EPC and second EPC. The S1 interface 916 as defined by 3GPP may support a many-to-many relation between the first and second EPC, and eNodeB 902, 904, 906, i.e. theoretically different operators may simultaneously operate the same eNodeB 902, 904, 906. The eNodeBs 902, 904, 906 may provide mobile radio coverage for the radio communication terminal device located in the respective mobile radio cells 918, 920, 922.

The high-level network architecture of LTE may include the radio access network E-UTRAN (Evolved UMTS (Universal Mobile Telecommunications System) Terrestrial Radio Access Network) and the core network EPC (Evolved Packet Core). The E-UTRAN may include base transceiver stations eNodeB (eNBs) 902, 904, 906. Each eNB 902, 904, 906 may provide radio coverage for one or more mobile radio cells within E-UTRAN. Control and user data may be transmitted between a respective eNB 902, 904, 906 and a UE in a mobile radio cell over the air interface on the basis of a multiple access method. The eNBs may be interconnected with each other by means of the X2 interface. The eNBs 902, 904, 906 may also be connected by means of the S1 interface to the EPC (Evolved Packet Core), more specifically to the MME (Mobility Management Entity) 910, 914, and to the Serving Gateway (S-GW) 910, 914. The MME 910, 914 may be responsible for controlling the mobility of UEs located in the coverage area of E-UTRAN, while the S-GW 910, 914 may be responsible for handling the transmission of user data between UE and network.

In LTE the following types of duplexing methods may be supported: full-duplex FDD (frequency division duplexing), half-duplex FDD and TDD (time division duplexing). Full-duplex FDD may use two separate frequency bands for uplink and downlink transmissions, and both transmissions may occur simultaneously. Half-duplex FDD may also use two separate frequency bands for uplink and downlink transmissions, but both transmissions may be non-overlapping in time. TDD may use the same frequency band for transmission in both uplink and downlink. Within a time frame the direction of transmission may be switched alternatively between downlink and uplink.

Figure 10:
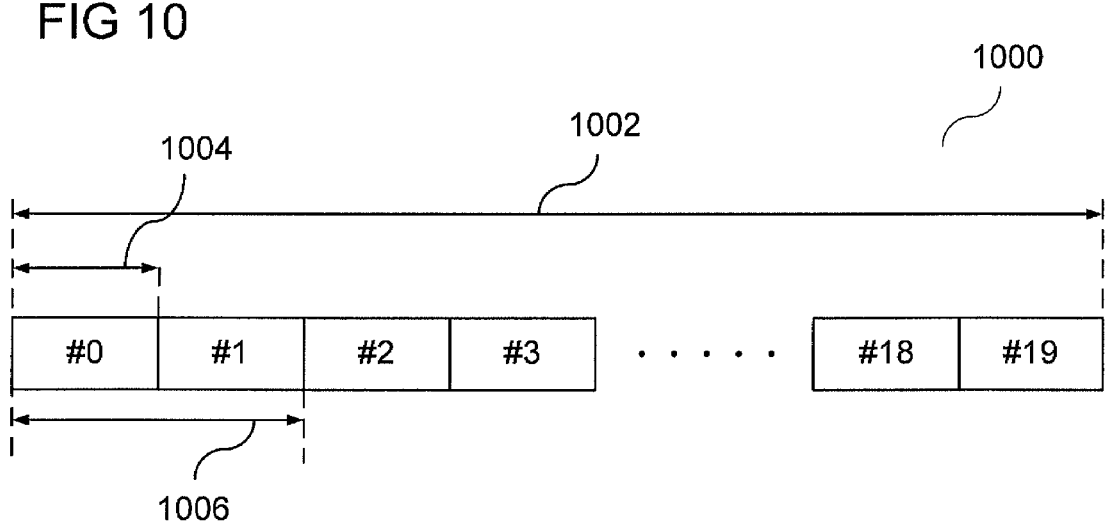
FIG. 10 shows a frame structure in accordance with an embodiment.

FIG. 10 shows a frame structure 1000 in accordance with an embodiment. The frame structure type 1 for FDD as shown in FIG. 10 may be applicable to both full-duplex and half-duplex FDD. Each radio frame 1002 may be 10 ms long (this length may for example be denoted $T_f$ and may be the length of 307 200 basic lengths $T_s$) and may include or consist of 20 slots 1004 of length 0.5 ms (this length may for example be denoted $T_{slot}$ and may be the length of 15360 basic lengths $T_s$), numbered from #0 to #19. A subframe 1006 may be defined as two consecutive slots. In each 10 ms interval 10 subframes may be available for downlink transmissions and 10 subframes may be available for uplink transmissions.

Uplink and downlink transmissions may be separated in the frequency domain. Depending on the slot format, a subframe may consist of 14 or 12 OFDMA (Orthogonal Frequency Division Multiple Access) symbols in DL and 14 or 12 SC-FDMA (Single Carrier Frequency Division Multiple Access) symbols in UL respectively. Further, due to the TDMA (Time Division Multiple Access) component of the LTE multiple access schemes in UL and DL so-called timing advance (TA) adjustments for the uplink transmissions may take place with the aim that a signal from a UE may arrive at the base transceiver station according to the determined frame/subframe timing and does not interfere with the transmission of others UEs. A timing advance value may correspond to the length of time a UE has to advance its timing of UL transmission and may be sent by the eNodeB to UE according to the perceived propagation delay of UL transmissions.

In an idle mode, as will be explained in further detail below, an LTE-A UE may desire to find a suitable cell to camp on. In 3GPP a suitable cell may be defined as a cell that among other is not barred and on which the UE may camp on to obtain normal service. In the context of LTE-A an idle mode LTE-A UE may be desired to camp on (at least) one suitable component carrier. But due to carrier aggregation and characteristics of mobile radio propagation the candidate component carriers in an LTE-A radio cell may have different coverage and different interference characteristics. As a consequence, an Idle mode LTE-A UE may be desired to search for suitable cells and component carriers more frequently compared to an LTE system, which may impact UE battery consumption. According to various embodiments, apparatuses and methods are provided for LTE-A UEs to allow for selecting a suitable cell and component carrier of a LTE-A radio cell in an efficient way, for example from UE battery consumption perspective.

3GPP introduced LTE into the Release 8 version of UMTS standards. With LTE the UMTS air interface may be further optimized for packet data transmission by improving the system capacity and the spectral efficiency. Amongst others, the maximum net transmission rate may be increased significantly, for example to 300 Mbps in the downlink transmission direction and to 75 Mbps in the uplink transmission direction. Further, LTE may support scalable bandwidths of [1.4, 3, 5, 10, 15, 20] MHz and may be based on new multiple access methods, i.e. OFDMA/TDMA in downlink and SC-FDMA/TDMA in uplink. OFDMA/TDMA, is a multicarrier multiple access method in which a subscriber may be provided with a defined number of subcarriers in the frequency spectrum and a defined transmission time for the purpose of data transmission. The RF capability of an LTE UE for transmission and reception may be set to 20 MHz. A physical resource block (PRB) may be the baseline unit of allocation for the physical channels defined in LTE. A physical resource block may include a matrix of 12 subcarriers by 6 or 7 OFDMA/SC-FDMA symbols. A pair of one OFDMA/SC-FDMA symbol and one subcarrier may be denoted as resource element.

Figure 11:
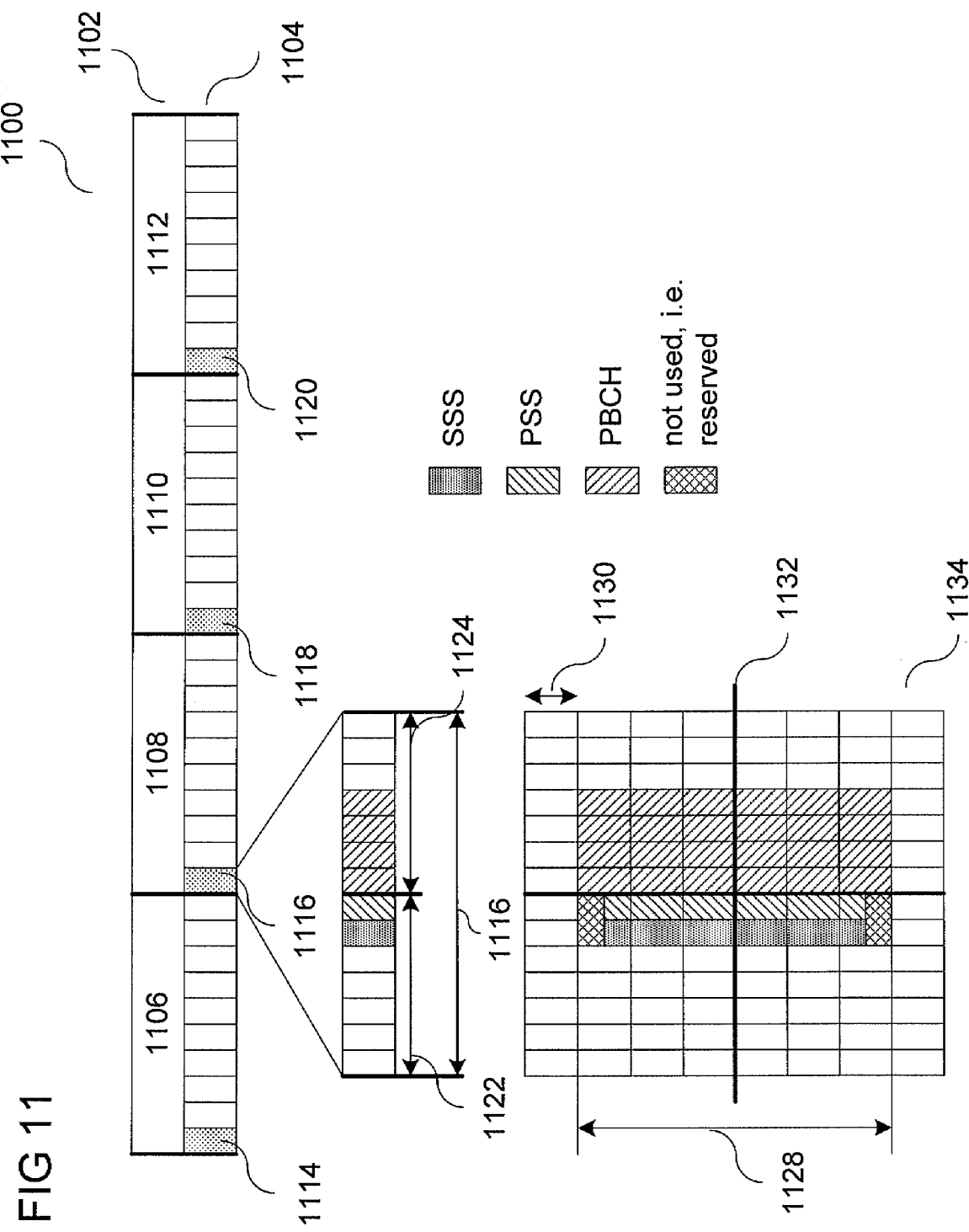
FIG. 11 shows a diagram illustrating time and frequency position of various signals in accordance with an embodiment.

FIG. 11 shows a diagram 1100 illustrating time and frequency position of various signals in accordance with an embodiment. By way of example, the time and frequency position of PSS (Primary Synchronisation Signal), SSS (Secondary Synchronisation Signal) and PBCH (Physical Broadcast Channel), as will be explained below is depicted. The DC (Direct Current) subcarrier may be the subcarrier around the carrier frequency.

Radio frames 1102 (for example a radio frame #i (1106), a radio frame #i+1 (1108), a radio frame #i+2 (1110) and a radio frame #i+3 (1112)) each may be divided into subframes 1104. The first subframe (subframe #0) of radio frame 1106 may be denoted by 1114. The first subframe (subframe #0) of radio frame 1108 may be denoted by 1116. The first subframe (subframe #0) of radio frame 1110 may be denoted by 1118. The first subframe (subframe #0) of radio frame 1112 may be denoted by 1120.

Each subframe may be divided into slots. For example the first subframe (subframe #0) 1116 may be divided into a first slot (slot #0) 1122 and a second slot (slot #1) 1124.

In accordance with various embodiments, with respect to cell search, i.e. for example synchronization to and identification of an LTE radio cell, the following physical signals and physical channel may be considered:

The PSS (Primary Synchronisation Signal) as indicated by hatching from the lower left corner to the upper right corner in FIG. 11 and SSS (Secondary Synchronisation Signal) as indicated by dense dotting in FIG. 11 may be used to acquire slot and frame timing of a cell, and to determine the physical layer cell identity. The PSS and SSS may be mapped in frequency-domain to 62 subcarriers around the DC (Direct Current) subcarrier, and in time-domain to the last/2nd last OFDMA symbol in slots 0 and 10 in each radio frame.

The PBCH (Physical Broadcast Channel) as indicated by hatching from the upper left corner to the lower right corner in FIG. 11 may be used to signal cell-specific physical layer information such as DL bandwidth size and system frame number (SFN). The PBCH may be mapped in frequency-domain to 72 subcarriers (as indicated by arrow 1128) around the DC subcarrier 1132, and in time-domain to the first 4 OFDMA symbols in slot 1 in each radio frame. Overall, the PBCH may carry the following cell-specific physical layer information: DL bandwidth size (for example 3 bits), PHICH (Physical Hybrid ARQ (Automatic Repeat Request) Indicator Channel) configuration (for example 3 bits), System Frame Number (for example 8 bits), and Spare (for example 10 bits).

Double-hatching indicates not used, i.e. reserved blocks in FIG. 11. One Physical Resource Block (PRB) of the plurality of PRBs 1134 is indicated by arrow 1130.

In LTE system- and cell-specific parameters may be broadcast to all UEs in a cell as system information using:
  the Broadcast Control Channel (BCCH) logical channel, which may be mapped on to the Broadcast Channel (BCH) transport channel and may be physically sent on the Physical Broadcast Channel (PBCH) via the air interface;
  the Broadcast Control Channel (BCCH) logical channel, which may be mapped on to the Downlink Shared Channel (DL-SCH) transport channel and may be physically sent on the Physical Downlink Shared Channel (PD-SCH) via the air interface.

Overall, a large amount of system information may be transmitted to all UEs located in the radio cell. The information may be grouped into various blocks, also referred to as SIBs (System Information Block), according to the nature of the information.

Figure 12:
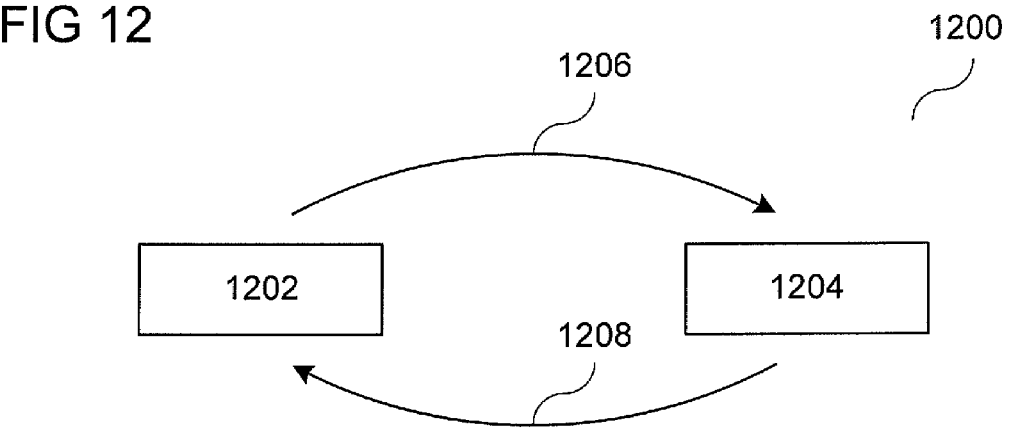
FIG. 12 shows connection states in accordance with various embodiments.

FIG. 12 shows a diagram 1200 illustrating connection states in accordance with various embodiments. For the efficient control of radio resources and communication connection between a UE and eNodeB two connection states may be specified, for example on RRC protocol layer, for example an idle mode 1202 (for example RRC_IDLE) and a connected mode 1204 (for example RRC_CONNECTED). The state may be changed from the idle mode 1202 to the connected mode 1204 as indicated by arrow 1206 representing connection establishment. The state may be changed from the connected mode 1204 to the idle mode 1202 as indicated by arrow 1208 representing connection release.

The RRC states as depicted in diagram 1200 may be as follows:

RRC_IDLE 1202:

UE position may be known by the network at tracking area level (a tracking area may define a group of cells where the UE in RRC_IDLE state 1202 registers, and where the UE is paged in case of incoming communication attempt);

UE may perform cell (re-)selection;

UE may acquire system information which are broadcast in the radio cell;

No transmission of user and control data in uplink and downlink;

UE may monitor a paging channel to receive notification about incoming calls or modification of system information; and

RRC CONNECTED 1204:

an RRC connection may be established;

Network controlled mobility may be performed by explicit handover and cell change order;

UE position may be known by the network at cell area level;

UE may acquire system information which are broadcast in the radio cell;

Transmission of user and control data in uplink and downlink;

UE may monitor a paging channel to receive notification about modification of system information.

The RRC connection may be defined as a point-to-point bidirectional connection between RRC peer entities in the UE and eNodeB. There may be either zero or one RRC connection between a UE and eNodeB.

An LTE UE in RRC_IDLE state may perform cell selection/reselection. Cell selection may be the process in which the UE searches for a suitable cell of the selected PLMN (Public Land Mobile Network) to camp on. The cell selection process may be triggered after power-on. Cell reselection may be the process in which the UE regularly searches for a more suitable cell of the selected PLMN to camp on. The cell reselection process may be triggered after camping on a suitable cell. A suitable cell may be defined as a cell that among other is not barred and on which the UE may camp on to obtain normal service. A UE may select/reselect a cell according to one of a variety of cell selection/reselection criteria. In general, cell selection/reselection may be based on "best cell" principle, for example based on measurements, the UE may desire to find the strongest cell (in terms of received signal quality) to camp on. If a better cell is found, that cell may be selected.

According to 3GPP, LTE may be advanced towards an IMT-Advanced (IMT: International Mobile Telecommunications) radio interface technology, which may be referred to as LTE-Advanced. In line with user trends and technology developments an objective of the IMT-Advanced activities may be to develop mobile radio communication systems that include new capabilities that go beyond those of current IMT-2000 systems such as UMTS (Universal Mobile Telecommunications System) or CDMA2000 (CDMA: Code division multiple access). Features to be supported by IMT-Advanced systems, for example according to ITU-R (International Telecommunication Union (ITU) Radiocommunication Sector) may include:

high quality mobile services;

worldwide roaming capability; and peak data rates of 100 Mbps (megabit per second) for high mobility environments and 1 Gbps (gigabit per second) for low mobility environments.

According to 3GPP, LTE-Advanced may include technologies to further evolve LTE in terms of spectral efficiency, cell edge throughput, coverage and latency. Candidate technologies may include multi-hop Relay, UL MIMO (multiple input, multiple output), for example with up to (4×4) antennas, DL MIMO, for example with up to (8×8) antennas, Coordinated Multipoint Transmission/Reception (CoMP), support of bandwidths higher than 20 MHz and up to 100 MHz by spectrum aggregation, flexible spectrum usage and/or spectrum sharing, and intercell interference management.

Furthermore, an LTE-Advanced network may be backward compatible with LTE, i.e. an LTE-Advanced eNodeB may also support LTE UEs which are located in the cell.

Figure 13:
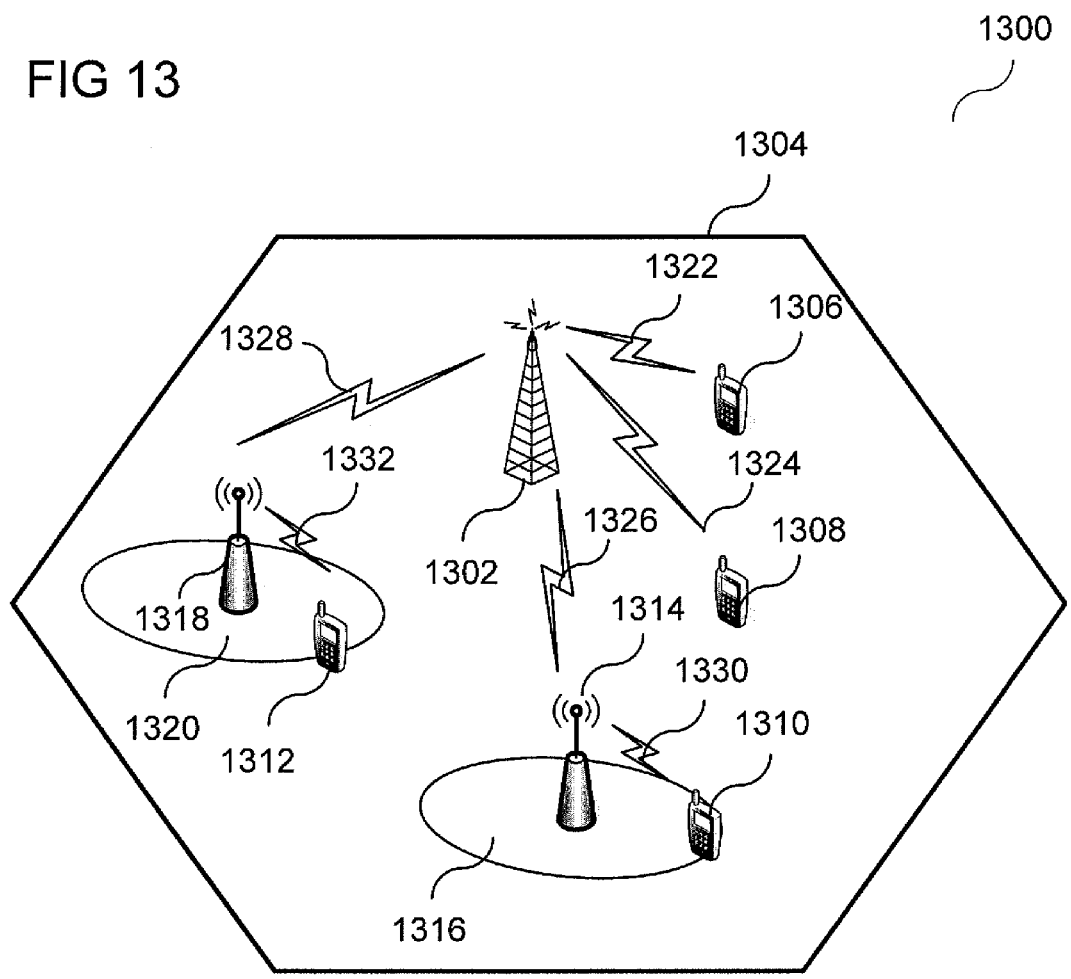
FIG. 13 shows a deployment scenario of LTE-Advanced (Long Term Evolution Advanced) in accordance with an embodiment.

FIG. 13 shows a deployment scenario 1300 of LTE-advanced in accordance with an embodiment. As shown in FIG. 13, coverage 1304 of a cell may be provided by an LTE-Advanced eNodeB 1302. The eNodeB 1302 may support direct connections to/from LTE-A UEs (LTE-advanced UEs) and LTE UEs as well. For example, the eNodeB 1302 may support direct connection to a first LTE UE 1306, as indicated by arrow 1322. For example, the eNodeB 1302 may support direct connection to a first LTE-A UE 1308, as indicated by arrow 1324. Relay nodes, referred to as NodeRs, may be deployed in the cell for providing additional coverage at cell-edge or coverage holes to all UEs (LTE-A and LTE UEs) located in these areas. UEs may communicate with the eNodeB in uplink and downlink through the intermediate NodeRs. For example, a first NodeR 1314 may provide a first additional coverage 1316. A second LTE-A UE 1310 may communicate via the first NodeR 1314 (as indicated by arrow 1330) with the eNodeB 1302 (as indicated by arrow 1326). For example, a second NodeR 1318 may provide a second additional coverage 1320. A second LTE UE 1312 may communicate via the second NodeR 1318 (as indicated by arrow 1332) with the eNodeB 1302 (as indicated by arrow 1328).

According to various embodiments, an Idle mode LTE-A UE may select a suitable cell and component carrier of an LTE-A radio cell to camp on. According to various embodiments, Idle mode LTE-A UEs may be provided with parameters to perform cell selection/reselection and component carrier selection in an efficient way. According to various embodiments, the signaled parameters may be specific to a component carrier and may be broadcast on the respective component carrier.

According to various embodiments, signaling of the parameters may include the following options as will be explained in more detail below: Transmission on the spare part of PBCH and Transmission on a new System Information Block (SIB).

According to various embodiments, parameters may be transmitted on the spare part of PBCH. On each component carrier of a LTE radio cell carrying PSS, SSS and PBCH, for example the current ten spare bits of PBCH, may be used for signaling following parameters:

a) "Reservation flag" (for example 1 bit) with exemplary values "barred", "not barred":

If this flag is set to "barred", then the UE may not be allowed to camp on this component carrier. Instead, UE may be desired to try to select any of the component carrier(s) as provided by the parameter "Component carrier(s) allowed for selection" below.

If this flag is set to "not barred", then the UE may be allowed to camp on this component carrier.

b) "Cell selection/reselection prioritization" (for example 1 bit) with exemplary values "Yes", "No":

If this flag is set to "Yes", then cell selection/reselection may have higher priority than component carrier selection, i.e. UE may be desired to perform cell selection/reselection in case of coverage and interference issues on this component carrier.

If this flag is set to "No", then cell selection/reselection may have lower priority than component carrier selection, i.e. UE may be desired to perform component carrier selection in case of coverage and interference issues on this component carrier.

c) Component carrier(s) allowed for selection:

In case of single band deployment scenario up to two component carriers may be signaled as follows:

"Component carrier-1" (for example 4 bits) with exemplary value range of [−40, −20, −15, −10, −5, −3, 3, 5, 10, 15, 20, 40] in MHz.

"Component carrier-2" (for example 4 bits) with exemplary value range of [−40, −20, −15, −10, −5, −3, 3, 5, 10, 15, 20, 40] in MHz.

The values may signal the carrier frequency of the component carriers by indicating the frequency distance to the carrier frequency of current component carrier.

In case of multi band deployment scenario one component carrier may be signaled as follows:

"Band indicator" (for example 4 bits) with exemplary value range of Band 1, Band 2, . . . , Band 16]. This value may signal the frequency band in where the component carrier is located.

"Carrier frequency" (4 bits) with exemplary value range of [−400, −200, −150, −100, −50, 50, 100, 150, 200, 400] in MHz.

The values may signal the carrier frequency of the component carrier by indicating the frequency distance to the center frequency of the signaled frequency band.

According to various embodiments, parameters may be transmitted on a new System Information Block (SIB). On each component carrier of a LTE radio cell (i.e. also on component carriers not carrying PSS, SSS and PBCH) the following parameters may be signaled via a new SIB:

a) "Reservation flag" (for example 1 bit) with exemplary values "barred", "not barred", as explained above.

b) Cell selection/reselection prioritization (for example 1 bit) with exemplary values "Yes", "No", as explained above.

c) N (with an integer number N) component carrier(s) allowed for selection, for example as a list, for example "Carrier frequency-1", . . . , "Carrier frequency-N".

According to various embodiments, the LTE-A network may decide which signaling option to use. For instance, the first option (using spare bits) may be the preferred signaling option in case the number of component carriers allowed for selection to be signaled is limited to one or two component carriers and the component carrier carries PSS, SSS and PBCH. In all other cases, the second option (using SIB) may be the preferred signaling option.

According to various embodiments, guidance may be provided to UE whether cell selection/reselection or component carrier selection shall be performed in case of coverage and interference issues on a component carrier.

According to various embodiments, an efficient method for cell selection/reselection and component carrier selection in terms of speed and UE battery consumption may be provided.

According to various embodiments, frequent triggering of cell selection/reselection processes may be avoided.

According to various embodiments, LTE-A UEs may be provided with parameters to perform cell selection/reselection and component carrier selection in an efficient way. The signaled parameters may be specific to a component carrier and may be broadcast only on the respective component carrier. Further, two options for signaling may be provided: The parameters may be signaled either on the spare part of PBCH or on a new SIB.

In the following, further embodiments will be described, wherein the following configuration may be considered:

a) an LTE-Advanced network based on OFDMA/TDMA in downlink, SC-FDMA/TDMA in uplink, and operating in FDD mode;

b) deployment scenario of an LTE-Advanced network as depicted in FIG. 13, where coverage of the LTE-A radio cell may be provided by an LTE-A eNodeB. The eNodeB may support direct connections to/from LTE-A UEs and LTE UEs as well. Relay nodes, referred to as NodeRs, may be deployed in the cell for providing additional coverage at cell-edge or coverage holes to all UEs (LTE-A and LTE UEs) located in these areas. UEs may communicate with the eNodeB in uplink and downlink through the intermediate NodeRs.

Figure 14:
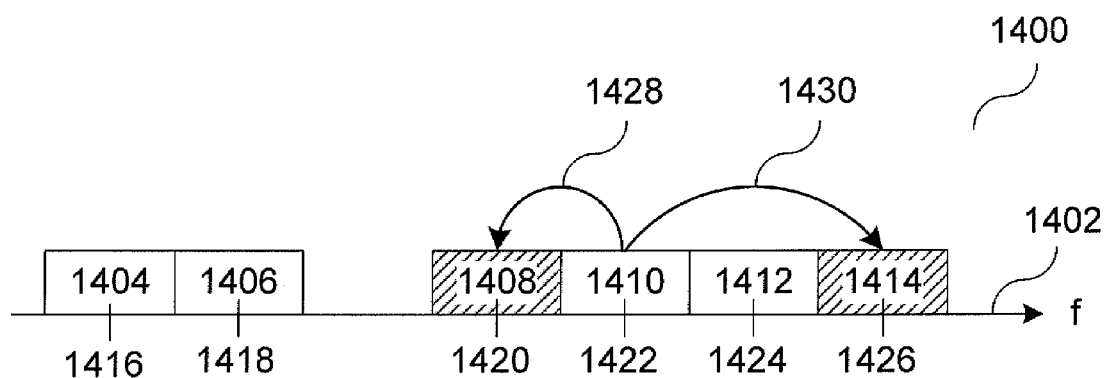
FIG. 14 shows a diagram illustrating component carrier selection in accordance with an embodiment.

FIG. 14 shows a diagram 1400 illustrating component carrier selection in accordance with an embodiment. In accordance with an embodiment, a single band, contiguous and asymmetric RF deployment scenario of the LTE radio cell in UL/DL may be provided, wherein the bandwidth size of each component carrier may be 20 MHz. The UL may be composed of two adjacent component carriers (a first uplink CC 1404 and a second uplink CC) 1406 specified by the respective carrier frequencies (a first uplink carrier frequency 1416 and a second uplink carrier frequency 1418). For illustration purposes, component carriers are shown over the frequency (f) axis 1402. The DL may be composed of four adjacent component carriers (a first downlink CC 1408, a second downlink CC 1410, a third downlink CC 1412, and a fourth downlink CC 1414) specified by the respective carrier frequencies (a first downlink carrier frequency 1420, a second downlink carrier frequency 1422, a third downlink carrier frequency 1424, and a fourth downlink carrier frequency 1426). All DL component carriers 1408 to 1414 specified by the carrier frequencies 1420 to 1426 may carry PSS, SSS and PBCH as depicted in FIG. 11.

In the following, the second DL component carrier 1410 specified by the second carrier frequency 1422 may be considered. In accordance with various embodiments, the second downlink component carrier 1410 may signal the following parameters on the spare part of PBCH:

a) "Reservation flag": set to "not barred", i.e. an LTE-A UE may be allowed to camp on this component carrier;

b) "Cell selection/reselection prioritization": set to "No", i.e. cell selection/reselection may have lower priority than component carrier selection, i.e. UE may be desired to perform component carrier selection in case of coverage and interference issues on this component carrier;

c) Component carriers allowed for selection:

"Component carrier-1": set to −20 MHz for indicating the first downlink component carrier 1408 specified by the first downlink carrier frequency 1420.

"Component carrier-2": set to 40 MHz for indicating the fourth downlink component carrier 1414 specified by the fourth downlink carrier frequency 1426.

The first LTE-A UE 1308 according to FIG. 13 may be in Idle mode (for example RRC_IDLE state) and may be camped on the second downlink component carrier 1410. Due to coverage and interference issues on this component carrier, the signal quality may fall below a threshold so that the first LTE-A UE 1308 may trigger component carrier selection. As candidate component carriers (indicated by hatched boxes in FIG. 13) the first LTE-A UE 1308 may take into account the first downlink component carrier 1408 (as indicated by arrow 1428) and the fourth downlink component carrier 1414 (as indicated by arrow 1414). In case both component carriers are not barred and the corresponding signal qualities are above a threshold, the first LTE-A UE 1308 may select the component carrier with the better signal quality.

In another embodiment, the same embodiment as described with reference to FIG. 14 above may be provided, with the exception that second downlink component carrier 1410 may signal the following parameters on the spare part of PBCH:

a) "Reservation flag": set to "not barred", i.e. an LTE-A UE may be allowed to camp on this component carrier; and b) "Cell selection/reselection prioritization": set to "Yes", i.e. cell selection/reselection may have higher priority than component carrier selection, i.e. UE may be desired to perform cell selection/reselection in case of coverage and interference issues on this component carrier.

In accordance with various embodiments, the first LTE-A UE 1308 according to FIG. 13 may be in Idle mode (for example RRC_IDLE state) and may be camped on the second downlink component carrier 1410. Due to coverage and interference issues on this component carrier, the signal quality may fall below a threshold so that the first LTE-A UE 1308 may trigger cell selection/reselection.

Figure 15:
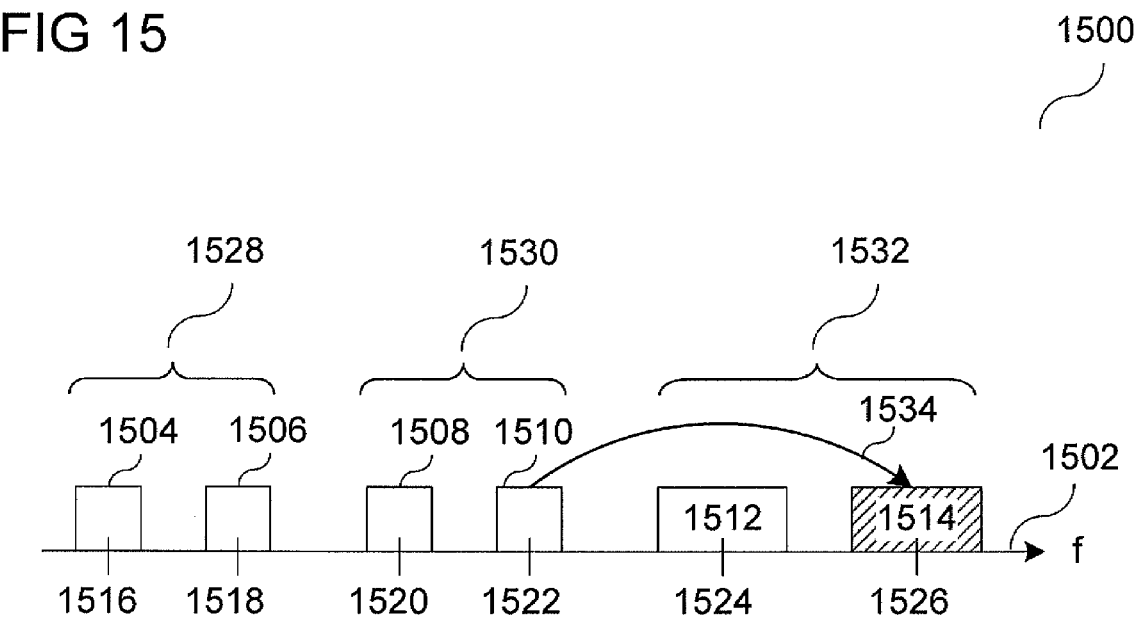
FIG. 15 shows a diagram illustrating component carrier selection in accordance with an embodiment.

FIG. 15 shows a diagram 1500 illustrating component carrier selection in accordance with an embodiment. In accordance with an embodiment, a multi band, non-contiguous and symmetric RF deployment scenario of the LTE radio cell in UL/DL may be provided. The UL may be composed of three component carriers (a first UL component carrier 1504, a second UL component carrier 1508, and a third UL component carrier 1512) specified by the respective carrier frequencies (a first UL carrier frequency 1516, a second UL carrier frequency 1520, and a third UL carrier frequency 1524). For illustration purposes, component carriers are shown over the frequency (f) axis 1502. The DL may be composed of three component carriers (a first DL component carrier 1506, a second DL component carrier 1510, and a third DL component carrier 1514) specified by the respective carrier frequencies (a first DL carrier frequency 1518, a second DL carrier frequency 1522, and a third DL carrier frequency 1526). All DL component carriers 1506, 1510 and 1514 specified by the carrier frequencies 1518, 1522, and 1526 may carry PSS, SSS and PBCH as depicted in FIG. 11. The first UL CC 1504 and the first DL CC 1506 may be provided in a first frequency band as indicated by bracket 1528, for example on Band 3, for example on a 1.8 GHz band. The second UL CC 1508 and the second DL CC 1510 may be provided in a second frequency band as indicated by bracket 1530, for example on Band 1, for example on a 2.1 GHz band. The third UL CC 1512 and the third DL CC 1514 may be provided in a third frequency band as indicated by bracket 1532, for example on Band 7, for example on a 2.6 GHz band.

In the following, the second DL component carrier 1510 specified by the second DL carrier frequency 1522 may be considered. According to an embodiment, the second DL component carrier 1510 may signal the following parameters on the spare part of PBCH:

a) "Reservation flag": set to "not barred", i.e. an LTE-A UE may be allowed to camp on this component carrier;

b) "Cell selection/reselection prioritization": set to "No", i.e. cell selection/reselection may have lower priority than component carrier selection, i.e. UE may be desired to perform component carrier selection in case of coverage and interference issues on this component carrier; and a) component carrier(s) allowed for selection:

"Band indicator": set to "Band 7"; and

Carrier frequency": set to 400 MHz.

The first LTE-A UE 1308 according to FIG. 13 may be in Idle mode (i.e. RRC_IDLE state) and may be camped on the second DL component carrier 1510. Due to coverage and interference issues on this component carrier, the signal quality may fall below a threshold so that the first LTE-A UE 1308 may trigger component carrier selection. As candidate component carrier (indicated by a hatched box in FIG. 15), the first LTE-A UE 1308 may take into account, as indicated by arrow 1534, the third DL component carrier 1514 located in Band 7 (1532). In case the component carrier is not barred and the signal quality is above a threshold, the first LTE-A UE 1308 may select this component carrier.

In another embodiment, the same embodiment as described with reference to FIG. 15 may be provided as a multi band, non-contiguous and symmetric RF deployment scenario of the LTE radio cell in UL/DL, with the exception that only the first DL component carrier 1506 specified by the first DL carrier frequency 1518 and the third DL component carrier 1514 specified by the third DL carrier frequency 1526 may carry PSS, SSS and PBCH as depicted in FIG. 11, i.e. for example the second DL component carrier 1510 may not carry PSS, SSS and PBCH. In accordance with various embodiments, the second DL component carrier 1510 specified by the second DL carrier frequency 1522 may signal the following parameters on a new SIB that may be physically sent on the Physical Downlink Shared Channel (PDSCH) via the air interface:

a) "Reservation flag": set to "not barred", i.e. an LTE-A UE is allowed to camp on this component carrier;

b) "Cell selection/reselection prioritization": set to "No", i.e. cell selection/reselection may have lower priority than component carrier selection, i.e. UE may be desired to perform component carrier selection in case of coverage and interference issues on this component carrier; and c) component carriers allowed for selection:

"Carrier frequency-1": set to the first DL carrier frequency 1518 located in the first band 1528; and "Carrier frequency-N" (for example "Carrier frequency-2"): set to the third DL carrier frequency 1526 located in the third band 1532.

In accordance with various embodiments, the first LTE-A UE 1308 according to FIG. 13 may be in Idle mode (for example in RRC_IDLE state) and may be camped on the second DL component carrier 1510. Due to coverage and interference issues on this component carrier, the signal quality may fall below a threshold so that the first LTE-A UE 1308 may trigger component carrier selection. As candidate component carriers, the first LTE-A UE 1308 may take into account the first DL component carriers 1506 located in the first band 1528 and the third DL component carrier 1514 located in the third band 1532. In case the component carriers are not barred and the corresponding signal qualities are above a threshold, the first LTE-A UE 1308 may select the component carrier with the better signal quality.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A radio base station, comprising:
a transceiver configured to communicate with a radio communication device using a plurality of component carriers; and
a message generator configured to generate an idle mode message including an information item related to at least one of the component carriers of the plurality of component carriers of the radio base station;
wherein the transceiver is further configured to transmit the generated idle mode message to the radio communication device;
wherein the transceiver is further configured to transmit the generated idle mode message to the radio communication device using a pre-defined component carrier;
wherein the information item comprises cell selection/reselection prioritization information indicating which one of cell selection/reselection and component carrier selection has higher priority for the radio communication device when leaving the pre-defined component carrier;
wherein the information item comprises allowed component carrier information indicating at least one component carrier as a candidate for component carrier selection for the radio communication device; and
wherein at least one component carrier as a candidate for component carrier selection for the radio communication device is represented by at least one of a frequency band in which the at least one component carrier is located and a frequency distance between the center frequency of the at least one component carrier and the pre-defined component carrier.

2. The radio base station of claim 1,
wherein the information item further comprises reservation information indicating whether the radio communication device is allowed to camp on the pre-defined component carrier.

3. The radio base station of claim 1,
wherein the information item is related to at least one component carrier different from the pre-defined component carrier.

4. The radio base station of claim 1,
wherein the transceiver is further configured to broadcast the generated idle mode message to the radio communication device.

5. The radio base station of claim 1,
wherein the transceiver is further configured to transmit the generated idle mode message to the radio communication device using a system information block.

6. A radio communication device, comprising:
a transceiver configured to communicate with a radio base station using a plurality of component carriers;
wherein the transceiver is further configured to receive an idle mode message from the radio base station; and
a message extractor configured to extract from the received idle mode message an information item related to at least one of the component carriers of the plurality of component carriers of the radio base station,
wherein the transceiver is further configured to receive the idle mode message from the radio base station using a pre-defined component carrier,
wherein the information item comprises cell selection/reselection prioritization information indicating which one of cell selection/reselection and component carrier selection has higher priority for the radio communication device when leaving the pre-defined component carrier;
wherein the information item comprises allowed component carrier information indicating at least one component carrier as a candidate for component carrier selection for the radio communication device;
wherein at least one component carrier as a candidate for component carrier selection for the radio communication device is represented by at least one of a frequency band in which the at least one component carrier is located and a frequency distance between the center frequency of the at least one component carrier and the pre-defined component carrier.

7. The radio communication device of claim 6,
wherein the information item further comprises reservation information indicating whether the radio communication device is allowed to camp on the pre-defined component carrier.

8. The radio communication device of claim 6, further comprising:
a component carrier leaving circuit configured to perform one of cell selection/reselection and component carrier selection based on the cell selection/reselection prioritization information.

9. The radio communication device of claim 6,
wherein the information item is related to at least one component carrier different from the pre-defined component carrier.

10. The radio communication device of claim 6, further comprising:
a component carrier selection circuit configured to select a component carrier based on the allowed component carrier information.

11. The radio communication device of claim 6,
wherein the transceiver is further configured to receive the idle mode message from the radio base station by broadcast.

12. The radio communication device of claim 6,
wherein the transceiver is further configured to receive the idle mode message from the radio base station mode using a system information block.

* * * * *